Patented Apr. 24, 1923.

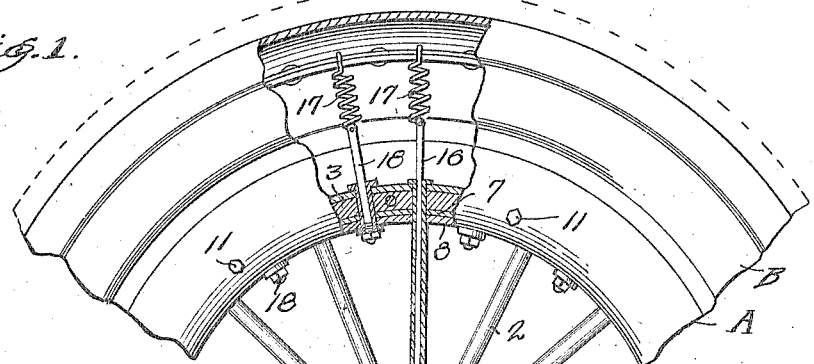

1,453,247

UNITED STATES PATENT OFFICE.

CHARLES A. KIGGINS, OF WESKAN, KANSAS.

SPRING WHEEL.

Application filed February 25, 1920. Serial No. 361,131.

*To all whom it may concern:*

Be it known that I, CHARLES A. KIGGINS, a citizen of the United States, residing at Weskan, in the county of Wallace and State of Kansas, have invented certain new and useful Improvements in a Spring Wheel, of which the following is a specification.

The invention relates to vehicle wheels having a yieldable outer or tread portion to compensate for jar and vibration and thereby minimize the shock and the wear and tear on the vehicle as a whole and adjunctive parts thereof.

The drawings illustrate a preferred embodiment of my invention. However, I desire it to be understood that in adapting the same to meet different conditions, various changes in the form, proportion and minor details of construction may be resorted to without departing from the nature of the invention as claimed hereinafter.

Referring to the drawings hereto attached:—

Figure 1 is a side view of a portion of a vehicle wheel embodying the invention, parts being broken away to show more clearly the relative arrangement of the co-operating elements.

Figure 2 is a transverse section of the outer or rim portion of the wheel, the parts being illustrated on a larger scale.

Figure 3 is a sectional detail of a part of the inner annular member.

Figure 4 is a transverse section of a modified form of wheel.

Figure 5 is a sectional detail of the outer portion of the modification illustrated in Fig. 4.

Corresponding and like parts are referred to in the following description and indicated in the several views of the drawings by like reference characters.

The wheel in its general construction comprises a hub 1, spokes 2 and a rim, the latter embodying inner and outer hollow annular members and parts co-operating therewith.

The rim of the wheel comprises a felly 3, a felly band 4 and inner and outer hollow annular members, the inner annular member being fixed and the outer annular member being loose and having a limited eccentric movement which is provided to compensate for shock and vibration. The inner hollow annular member embraces opposite sides of the felly 3 and has side portions projecting outwardly from the felly in parallel relation to receive inwardly extending portions of the outer annular member. The inner annular member comprises inner and outer rings, a pair of complemental rings being provided for each side of the felly. Both rings have their inner portions curved inwardly to fit opposite sides of the felly, the curved portions fitting one against the other as indicated most clearly in Fig. 2. The outer portions of the rings of each pair are spaced apart to receive between them the inwardly extending side portions of the outer hollow member. The inner hollow member is indicated generally by the reference character A and the outer annular member by the letter B. The inner ring of the member A comprises the parts 5, 6 and 7. The part 7 of each inner ring curves to fit snugly against a side portion of the felly. The part 6 is offset inwardly to overlap the edge portion of the felly band 4. The part 5 extends outwardly parallel with the plane of the wheel. The outer ring of the inner hollow member A comprises parts 8 and 9. The part 8 curves inwardly to conform to the curved portion 7 of the inner ring and lies close against the same. The part 9 extends inwardly parallel with the part 5 of the inner ring and is spaced therefrom a distance corresponding to the extent of the offset portion 6, of the inner ring. A space 10 is formed between the outer extending portions 5 and 9 of the inner and outer rings. A plurality of bolts 11 extend through registering openings formed in the felly 3 and the curved portions 7 and 8 of the inner and outer rings comprising the member A. The inner edges of the rings are notched to receive the spokes 2.

The outer member B comprises side rings and a band 12, the latter connecting the outer portions of the side rings. Each side ring of the member B comprises portions 13 and 14. The part 13 curves outwardly. The part 14 extends inwardly and is adapted to obtain a snug fit in the space 10. The parts 14 of the side rings are parallel and the outwardly curved portions 13 flare. The meeting edges of the band 12 and side rings are inwardly flanged as indicated at 15, and are adapted to receive bolts, rivets or other fastening means whereby the parts are made secure. The band 12 may be of any form in cross section and constitutes the tread of the wheel and it is obvious that the same may, if preferred, be fitted with any type of tire such as indicated by the dotted lines in Fig. 1.

The spokes 2 are hollow as indicated most clearly by the sectional detail in Fig. 1. A rod 16 passes through each of the spokes 2 and is secured at its inner end to the hub 1 in any substantial way. The outer portion of the rod 16 projects into the space enclosed by the annular hollow members A and B. Contractile helical springs 17 connect the outer end of each of the rods 16 with opposite side portions of the hollow annular member B. The springs 17 incline laterally and outwardly from their inner ends as shown most clearly in Fig. 2. The inner ends of the springs 17 are engaged with the outer end of the rod 16 and the outer ends of the springs are connected with the inner flanges 15 of the band 12 and side rings. The outer end portions of the spokes 2 extend through the felly 3, felly band 4 and the notched edges of the curved portions 7 and 8 of the inner rings comprising the member A. Short rods 18 are secured at their inner ends to the felly of the wheel and project outwardly a distance equal to the projecting ends of the rod 16. This is best illustrated in Fig. 1. Springs 17 connect the outer ends of the rods 18 with the flanges 15 in a manner hereinbefore described. A rod 18 is located between each two of the spokes thereby doubling the number of the pairs of oppositely inclined springs 17. The springs 17 are normally under tension and exert a pulling force and by reason of their disposition the central portion of the wheel is practically spring suspended and is adapted to receive an eccentric movement as the load point changes when the wheel is in service. By having the central portion of the wheel spring suspended and mounted to receive an eccentric movement provision is had for compensation for shock and vibration whereby easy riding results and the mechanism of a motor propelled vehicle is subjected to a minimum amount of shock and consequent wear and tear.

In the modification shown in Fig. 4 and the detail view thereof the wheel comprises a hub 1, spokes 2 and an outer hollow rim which comprises inner annular member C and an outer annular member D both annular members being hollow and the outer member having a limited eccentric movement with reference to the inner annular member. In addition to the spokes 2, stays 19 are interposed between the hub and rim and serve to reinforce the rim. The inner portion of the annular member D fits loosely within the member C and its outer portion is widened to provide ample tread for sustaining the load and preventing the formation of ruts in the surface of the road. Each of the spokes 2 is provided with a rod 20 which is fixed. The outer end portion of each rod 20 extends into the hollow rim and its outer end is connected with side portions of the outer part of the member D by means of oppositely inclined contractile helical springs 21 in a manner similar to the connection between the outer ends of the rods 16 and 18 and opposite side portions of the member B. The openings in the inner wall of the member D through which the rods 20 pass are elongated circumferentially whereby to make provision for the movement of the part D. This is indicated at 22 in Fig. 5. It is observed that in each instance, the central portion of the wheel is spring suspended, the springs being provided in pairs and the springs of each pair being oppositely inclined and serving to connect the outer ends of laterally disposed rods with side portions of the outermost part of the rim.

Having thus fully described my invention what I claim as new and desire to secure by Letters Patent, is:—

1. A resilient wheel comprising a hub, an inner rim portion, an outer rim portion slidably associated with the inner rim portion, tubular spokes rigidly connecting the inner rim portion and the hub, radially disposed rods connected with the hub and extending through the spokes and terminating short of the outer rim portion, oppositely disposed outwardly inclined springs connecting the outer ends of the rods with the opposite side faces of the outer rim portion, whereby said outer rim portion is connected directly with the hub.

2. A resilient wheel comprising a hub, an inner rim portion, an outer rim portion slidably associated with the inner rim portion, tubular spokes rigidly connecting the inner rim portion and the hub, radially extending rods fitted in the spokes and extending into the rim portions and terminating short of the outer wall of the outer rim portion, oppositely directed outwardly inclined coil springs secured to each rod at the outer terminal thereof and to the opposite side walls of the outer rim portion, relatively short rods rigidly secured to the inner rim portion intermediate the spokes extending radially from the inner rim portion and terminating short of the outer wall of the outer rim portion, and spring means connected with the terminals of the relatively short rods and with said outer rim sections.

In testimony whereof I affix my signature in presence of two witnesses.

CHARLES A. KIGGINS.

Witnesses:
J. AUG. JOHNSON.
JOHN A. ANDERSON.